April 8, 1958

C. C. MORSE 2,829,747

POWDERED MAGNETIC CLUTCH

Filed Dec. 23, 1953

INVENTOR.
CARSON C. MORSE
BY Maurice H. Klitzman
and Wade Lovitz
ATTORNEYS

United States Patent Office 2,829,747
Patented Apr. 8, 1958

2,829,747

POWDERED MAGNETIC CLUTCH

Carson C. Morse, Dayton, Ohio

Application December 23, 1953, Serial No. 400,153

3 Claims. (Cl. 192—21.5)

(Granted under Title 35, U. S. Code (1952), sec. 266)

The invention described herein may be manufactured and used by or for the Government for governmental purposes without payment to me of any royalty thereon.

This invention relates to a powdered magnetic clutch in which iron magnetic particles are suspended in with the fluid or the like for making a driving connection between the input drive and the output drive of the clutch.

In powdered magnetic operated clutches several problems exist when the coils are deenergized. Due to the vibratory forces that may exist from other machinery nearby, the powdered magnetic particles tend to collect at the bottom of the clutch and pack tightly in the air gap. This results in locking the input drive to the output drive even though the input drive is not energized and prevents the input drive from being operated in a manner so as not to move the output drive. There are many occasions when the magnetic clutch may be desired to be operated in such a manner that the input drive may operate freely without exerting any movement on the output drive. Also, considerable torque is required to break away the input drive from the output drive under this condition before normal operation can be achieved.

Previous methods of aiding the decoupling action between the input and output drives have relied on a locking means provided between the output member and the surrounding housing. This approach is not desirable since failure of the decoupling mechanism with the output drive locked to the housing will jam the input drive and could damage the input drive mechanism. It is, therefore, an object of this invention to provide a powdered magnetic clutch in which the input may operate independently of the output without exerting any movement on the output.

A further object of this invention is to provide a second electromagnet in a fluid clutch so as to prevent packing of the magnetic particles in the air gap area during stand still periods.

An additional object of the invention is to provide a magnetic clutch with a positive decoupling means that can never jam the input drive.

It is another object of this invention to provide a powdered magnetic clutch in which an input drive is rotatably mounted in the output drive housing. This housing is provided with a coil adapted to be energized so as to position the magnetic particles about the input disc. The housing is further provided with another coil which is so positioned that upon being energized the magnetic particles are drawn away from the input disc.

These and other objects will become more apparent when read in the light of the accompanying drawing in which—

Figure 1:
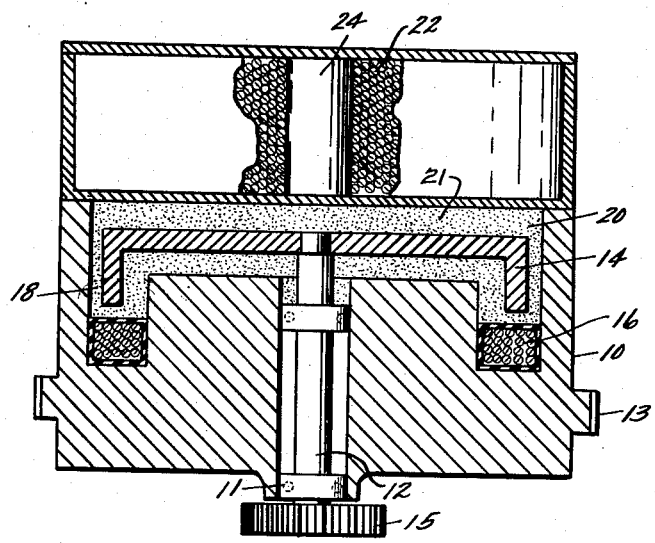
Figure 1 is a cross-sectional view of the magnetic fluid clutch.

Referring to Figure 1, the numeral 10 generally designates an output drive housing 10 in which is mounted an input shaft 12. The input shaft 12 is rotatably mounted in the housing by ball bearings 11, and has fixed at one end thereof an input clutch or disc member 14 and a drive 15 at the other end. The housing 10 is the output drive clutch and has a gear 13 fixed thereto. The housing 10 is further provided with a clutch coil 16. The interior of the housing is, as is customary in magnetic clutches, filled with a magnetic powder 20 such as iron filings mixed with oil. An air gap 18 is positioned between the output housing 10, the input clutch member 14 and the clutch coil 16 for purposes described below. The housing 10 is further provided with a solenoid coil 22 mounted longitudinally of the input clutch member 14 and spaced therefrom. The solenoid coil 22 surrounds a solenoid core 24. Coil 22, rigid with the cylindrical output housing 10 is cylindrical, coaxial, and has the same diameter as the housing. This provides a maximum direct line attraction between the powdered magnetic particles and the magnetic field of the coil resulting in a more rapid and complete decoupling of the input and output drives. With coil 22 rigidly secured to the output drive, if the positive decoupling action should fail, and the input and output drives remain locked together, the input drive could not jam and injure the input drive mechanism.

Figure 2:
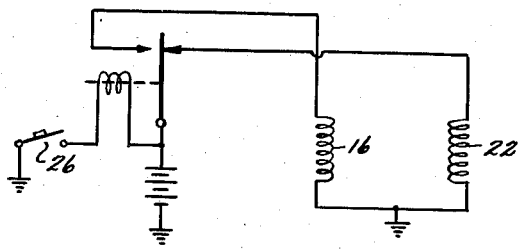
Figure 2 is a schematic drawing of the electrical circuit for the magnetic clutch.

Referring to Figure 2, a circuit is shown merely as representative of what type may be used with a magnetic clutch, but is not necessarily the only one, as others may be equivalent and be incorporated within the scope of this invention.

The circuit above shown is adapted to energize the coil 16 while the coil 22 is deenergized. By closing the switch 26 coil 16 will become deenergized and the coil 22 energized. By opening the switch 26 the coil 16 will become energized and coil 22 deenergized.

In operation, when the clutch coil 16 is desired to be deenergized, it is only necessary to close the switch 26. The coil 16 will be deenergized and the coil 22 energized so as to attract the powdered magnetic particles from the area or air gap 18 about the input clutch member 14 to the area or spacing 21 adjacent the solenoid coil 22, to positively decouple the input and output drives. This is possible because, as in most magnetic clutches, the magnetic powder is suspended in a fluid such as oil, and when the magnetic field is actuated, the magnetic powder flows in the oil along the lines of magnetic force. As seen in the drawings, air gap 18 is substantially smaller than spacing 21. This means it is only necessary to provide a concentration of powdered magnetic particles just sufficient to congregate in air gap 18 and couple the input clutch member 14 to the output housing 10 when the coil 16 is energized. Then when coil 16 is deenergized and coil 22 is energized, the concentration of powdered magnetic material will be insufficient to lock clutch member 14 to housing 10. When it is desired to energize the coil 16 so as to operate the output clutch 10 the switch 26 is opened. The clutch coil 16 will create a high magnetic flux density across the air gap 18 between the housing 10 and the input clutch member 14. The powdered magnetic particles will adhere to the input clutch member 14 and the driven clutch member 10 so as to effectively lock the two members together. Under these conditions the driven clutch member 10 and output gear 13 will rotate with the input clutch member 14.

It is, therefore, seen that the novel feature of this invention resides in the auxiliary electromagnet incorporated in a powdered magnetic clutch to hold the magnetic particles in a position remote from the air gap between the input clutch and the output clutch so as to prevent the powder from packing.

Although the specific apparatus embodying this invention has been shown and described, it will be understood that such a showing has been made in order that the invention may be more completely understood, however, such a showing is not to be considered as in any way limiting this invention. Many other types of apparatus may be used to carry out this invention as well as many modifications, additions and omissions from the particular apparatus shown and described, but such modifications, additions and omissions are intended to be included within the spirit and intent of this invention, whereby I claim:

1. A magnetic fluid clutch of the character described including a driving member and a driven member, a housing associated with said members and adapted to contain a magnetic particle fluid suspension, said driving and driven members being arranged to form a magnetic circuit with a relatively narrow gap between said members within said housing, electrical means for energizing said magnetic circuit to cause a concentration of magnetic particles in said gap to drivingly couple said driving member to said driven member, said housing being constructed to have a space for containing the magnetic particle fluid suspension which is large as compared to the dimensions of said gap, electromagnetic means positioned adjacent said housing space and adapted when energized to attract the magnetic particles within the fluid suspension and withdraw them from said gap and from the vicinity of the driven member whereby the driven member is quickly decoupled from the driving member, and means for selectively alternately energizing the said electrical means and the said electromagnetic means to thereby selectively couple and uncouple the driving and driven members.

2. A magnetic fluid clutch of the character described including a driving member and a driven member, said driving member including a housing rotatable therewith and adapted to contain a magnetic particle fluid suspension, said housing enclosing said driven member with said driving and driven members together forming a magnetic circuit having a relatively small gap between said members, an electrical circuit for energizing said magnetic circuit to cause a concentration of magnetic particles in said magnetic circuit gap to drivingly couple said driving and driven means and means for withdrawing the magnetic particles from said gap to prevent packing thereof and insure prompt uncoupling of said driving and driven members when said electrical circuit is deenergized comprising a fluid chamber in said housing connected to said gap and large in volume as compared thereto and an electromagnet positioned adjacent said chamber and adapted to be energized when said electric circuit is deenergized to withdraw the magnetic particles from said gap and adjacent said driven member to give a maximum uncoupling between said driving and driven members, said electromagnet being rotatable with said housing and driving member.

3. In a magnetic fluid clutch of the character described, coaxial driving and driven members, said driving member including a housing rotatable therewith and adapted to contain a magnetic particle fluid suspension, said housing enclosing said driven member and forming therewith a magnetic circuit having a relatively small gap between said members, a first coil positioned in said housing and rotatable therewith, an electrical circuit for energizing said first coil to thereby energize said magnetic circuit and concentrate the magnetic particles in said gap to drivingly couple said driving and driven members, an electromagnet positioned adjacent said housing and spaced from said gap and from said driven member, said housing having a chamber positioned between the electromagnet and the driven member adapted to contain the magnetic particle fluid suspension, the spacing of said electromagnet from the driven member being large as compared to the dimensions of the gap between the driven member and said housing, a second coil in said housing operatively associated with said electromagnet, a switch operative to connect said second coil to said electric circuit when said first coil is disconnected and vice versa, energizing said second coil and electromagnet causing a withdrawal of magnetic particles from said gap and the vicinity of said driven member when said first coil is deenergized to thereby prevent magnetic particle packing in said gap and a positive decoupling of said driving and driven members.

References Cited in the file of this patent

UNITED STATES PATENTS

| 2,548,373 | Hurvitz | Apr. 10, 1951 |
| 2,573,065 | Salemme | Oct. 30, 1951 |
| 2,612,248 | Feiertag | Sept. 30, 1952 |

FOREIGN PATENTS

| 892,098 | Germany | Oct. 5, 1953 |